US008060562B2

(12) United States Patent
Chesley

(10) Patent No.: US 8,060,562 B2
(45) Date of Patent: Nov. 15, 2011

(54) REAL TIME UPDATE NOTIFICATION

(75) Inventor: Harry R. Chesley, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1068 days.

(21) Appl. No.: 11/275,305

(22) Filed: Dec. 22, 2005

(65) Prior Publication Data

US 2006/0168002 A1     Jul. 27, 2006

Related U.S. Application Data

(63) Continuation of application No. 09/606,257, filed on Jun. 29, 2000, now Pat. No. 7,007,083.

(51) Int. Cl.
*G06F 15/16* (2006.01)
*H04L 12/28* (2006.01)

(52) U.S. Cl. ........ 709/204; 709/205; 709/206; 709/207; 370/254

(58) Field of Classification Search .................. None
See application file for complete search history.

(56) References Cited

U.S. PATENT DOCUMENTS

| | | | | |
|---|---|---|---|---|
| 5,388,196 A * | 2/1995 | Pajak et al. | ................ | 715/751 |
| 5,929,864 A * | 7/1999 | Picott et al. | ................ | 345/440 |
| 5,978,246 A * | 11/1999 | Shindo | .................. | 365/49.1 |
| 6,005,560 A * | 12/1999 | Gill et al. | ................ | 715/205 |
| 6,065,051 A * | 5/2000 | Steele et al. | ................ | 709/219 |
| 6,072,806 A * | 6/2000 | Khouri et al. | ................ | 370/465 |
| 6,073,214 A * | 6/2000 | Fawcett | .................. | 711/133 |
| 6,119,157 A * | 9/2000 | Traversat et al. | ........... | 709/220 |
| 6,144,888 A * | 11/2000 | Lucas et al. | .................. | 700/83 |
| 6,151,620 A * | 11/2000 | Madsen et al. | ................ | 709/204 |
| 6,249,806 B1 * | 6/2001 | Kohda et al. | .................. | 709/206 |
| 6,308,164 B1 * | 10/2001 | Nummelin et al. | ............. | 705/9 |
| 6,327,617 B1 * | 12/2001 | Fawcett | ...................... | 709/219 |
| 6,381,610 B1 * | 4/2002 | Gundewar et al. | ......... | 707/104.1 |
| 6,415,270 B1 * | 7/2002 | Rackson et al. | ................ | 705/37 |
| 6,430,608 B1 * | 8/2002 | Shaio | .......................... | 709/217 |
| 6,433,795 B1 * | 8/2002 | MacNaughton et al. | ..... | 715/738 |
| 6,449,365 B1 * | 9/2002 | Hodges et al. | ................ | 379/9.02 |
| 6,453,337 B2 * | 9/2002 | Miller et al. | .................. | 709/204 |
| 6,678,720 B1 * | 1/2004 | Matsumoto et al. | ......... | 709/204 |
| 6,691,153 B1 * | 2/2004 | Hanson et al. | ................ | 709/204 |
| 6,693,533 B2 | 2/2004 | Ebata | | |
| 6,704,907 B1 | 3/2004 | Aoki et al. | | |
| 6,728,760 B1 * | 4/2004 | Fairchild et al. | ............. | 709/217 |

(Continued)

OTHER PUBLICATIONS

Microsoft Computer Dictionary 5th Edition.*

(Continued)

*Primary Examiner* — Ario Etienne
*Assistant Examiner* — Ho Shiu

(57) ABSTRACT

Computer method and apparatus for communicating information between a plurality of client computers by means of a communications network. A data server computer coupled to the network communicates data from the data server computer to one or more of a plurality of client computers in response to a request for data by a client computer in the form of a hypertext transfer protocol update request. The data server computer sends the data made available from the data server computer in response to a data update request from one of the plurality of client computers to said data server computer. A communications server computer coupled to the communications network for communicating the fact that the data on the server has been updated by communicating a client to client message from the client computer that updated the data on the data server computer to other client computers thereby prompting said other client computers to request updated data from the data server computer.

15 Claims, 4 Drawing Sheets

U.S. PATENT DOCUMENTS 7,007,083 B1    2/2006    Chelsey
2007/0106629 A1*    5/2007    Endacott et al. ................ 706/47

OTHER PUBLICATIONS

Non-Final Office Action dated Aug. 4, 2003 in related U.S. Appl. No. 09/606,257.

Non-Final Office Action dated Jan. 8, 2004 in related U.S. Appl. No. 09/606,257.

Final Office Action dated Jun. 3, 2004 in related U.S. Appl. No. 09/606,257.

Non-Final Office Action dated Feb. 23, 2005 in related U.S. Appl. No. 09/606,257.

Notice of Allowance dated Nov. 16, 2005 in related U.S. Appl. No. 09/606,257.

Jeff Conklin and Michael L. Begeman, MCC, Software Technology Program, article entitled gIBIS: A Hypertext Tool for Exploratory Policy Discussion, ACM Transactions on Office Information System, vol. 6, No. 4, Oct. 1985, pp. 303-331.

J. Oikarinen and D. Reed memo dated May 1993 regarding Internet Relay Chat Protocol, 58 pages.

Fernando Flores, Michael Graves, Brad Hartfield and Terryj Winograd article entitled Computer Systems and the Design of Organizational Interaction, ACM Transactions on Office Information System, vol. 6, No. 2, Apr. 1988, pp. 153-172.

Beverly I. Kedzierski, Reading 10, "Communication and Management Support in System Development Environments", Computer-Supported Cooperative Work: A Book of Readings.

Thomas W. Malone, Kenneth R. Grant, Kum-Yew Lai, Ramana Rao and David Rosenblitt, Reading 12, "Semistructured Messages are Surprisingly Useful for Computer-Supported Coordination", Computer-Supported Cooperative Work: A Book of Readings.

Irene Greif and Sunil Sarin, Reading 17,"Data Sharing in Group Work", Computer-Supported Cooperative Work: A Book of Readings.

Robert H. Thomas, Harry Forsdick, Terrence R. Crowley, Richard W. Schaaf, Raymond S. Tomlinson, Virginia M. Travers and George G. Robertson, Reading 18, "Diamond: A Multimedia Message System Built on a Distributed Architecture", Computer-Supported Cooperative Work: A Book of Readings.

"Functionality Provided by Systems for Synchronous Conferencing", Carl Von Loesch, Published Jun. 22, 2006, 13 pgs., reprinted from the Internet at: http://www.psyc.eu/synconf.

"Structured Online Interactions: Improving the Decision-Making of Small Discussion Groups", Shelly Farnham, Harry R. Chesley, Debbie E. McGhee, Reena Kawal and Jennifer Landau, Published 2000, 10 pgs. http://citeseerx.ist.psu.edu/viewdoc/download?doi=10.1.1.24.5919&rep=rep1&type=pdf.

* cited by examiner

REAL TIME UPDATE NOTIFICATION

CROSS REFERENCE TO RELATED APPLICATION

This application is a continuation of U.S. patent application Ser. No. 09/606,257, filed Jun. 29, 2000, now U.S. Pat. No. 7,007,083, the contents of which are hereby incorporated by reference.

FIELD OF THE INVENTION

The present invention concerns a process and apparatus for transmitting information between computers and more particularly concerns a process and apparatus that utilizes two existing communications protocols to achieve real time updating of information on disparate computers.

BACKGROUND ART

Communications between users over computer networks is routinely used to perform collaborative tasks. E-mail, for example, is frequently used to allow collaborators to share ideas and share in the performance of tasks. Sending messages back and forth during a collaborative project can occur on a company wide network as well as over the Internet. As network based messaging becomes more common, network users have legitimately become concerned about the security of such communications.

Messages from outside a company maintained network are routinely screened by means of software and hardware firewalls that accept only messages conforming to certain protocols. One common protocol that is understood by such firewalls is the hypertext transfer protocol (HTTP). A second commonly recognized protocol is the Internet relay chat protocol (IRC). The hypertext transfer protocol is commonly used by server computers to communicate data to client computers. One features of HTTP is the typing and negotiation of data representation, allowing systems to communicate independently of the data being transferred. A client locates a server by means of a unique identifier and then polls the server for data using the HTTP protocol. The process of updating the contents transmitted to the client is dependent on the client periodically polling the server for new information.

The Internet relay chat (IRC) protocol has evolved over a number of years for use in text based conferencing and is also recognized by security firewalls commonly used to protect networks and/or computers from undesirable communications. A server forms the backbone of an IRC communications link. Multiple clients identified by a unique nickname connect to the server and communicate with each other. A channel within the IRC construct is a group of one or more clients which all receive messages addressed to that channel. Further details of the IRC protocol are contained in RFC (request for comments) 1459 of the network working group.

SUMMARY OF THE INVENTION

The present invention provides a new and improved means of communicating between computers which utilizes aspects of two existing communications protocols. Use of the invention allows real time updates for users who are interested in data which has recently been updated. An exemplary use of the invention is with a database that is continually being updated by inputs from multiple data sources. When a client makes a change to the database, in addition to updating the server that stores the database, an update notice is transferred through a real time update channel that indicates to other clients that the database has been updated. Any of a possible large number of clients can respond to this information by polling the server for a more up to date database record or query result. Other applications requiring updated information can benefit through practice of the invention.

To prevent difficulties associated with obtaining permissions for new protocols to pass through firewalls, an existing protocol such as IRC may be used as the real time update channel. Each IRC channel corresponds to a section of data. When the channel's section is updated, it notifies interested clients to poll the HTTP server to receive updated data.

An exemplary process of the invention provides a means of communicating information between a plurality of client computers. Data is provided on a data source such as a server computer and data on the server computer is communicated to one or more of a plurality of client computers in response to a request for data by the client computers. Periodically the data on the server computer is updated by sending data from one of the plurality of client computers to the server computer or alternately by the server software performing an update. The fact that the data on the server has been updated is made known to the clients by means of an update message indicating that updated data on the server computer is available. This allows the other client computers to determine if they should access the updated data on the server computer.

These and other objects, advantages and features of the invention will become better understood from the following detailed description of an exemplary embodiment of the invention which is described in conjunction with the accompanying drawings.

EXEMPLARY EMBODIMENT FOR PRACTICING THE INVENTION

Figure 1:
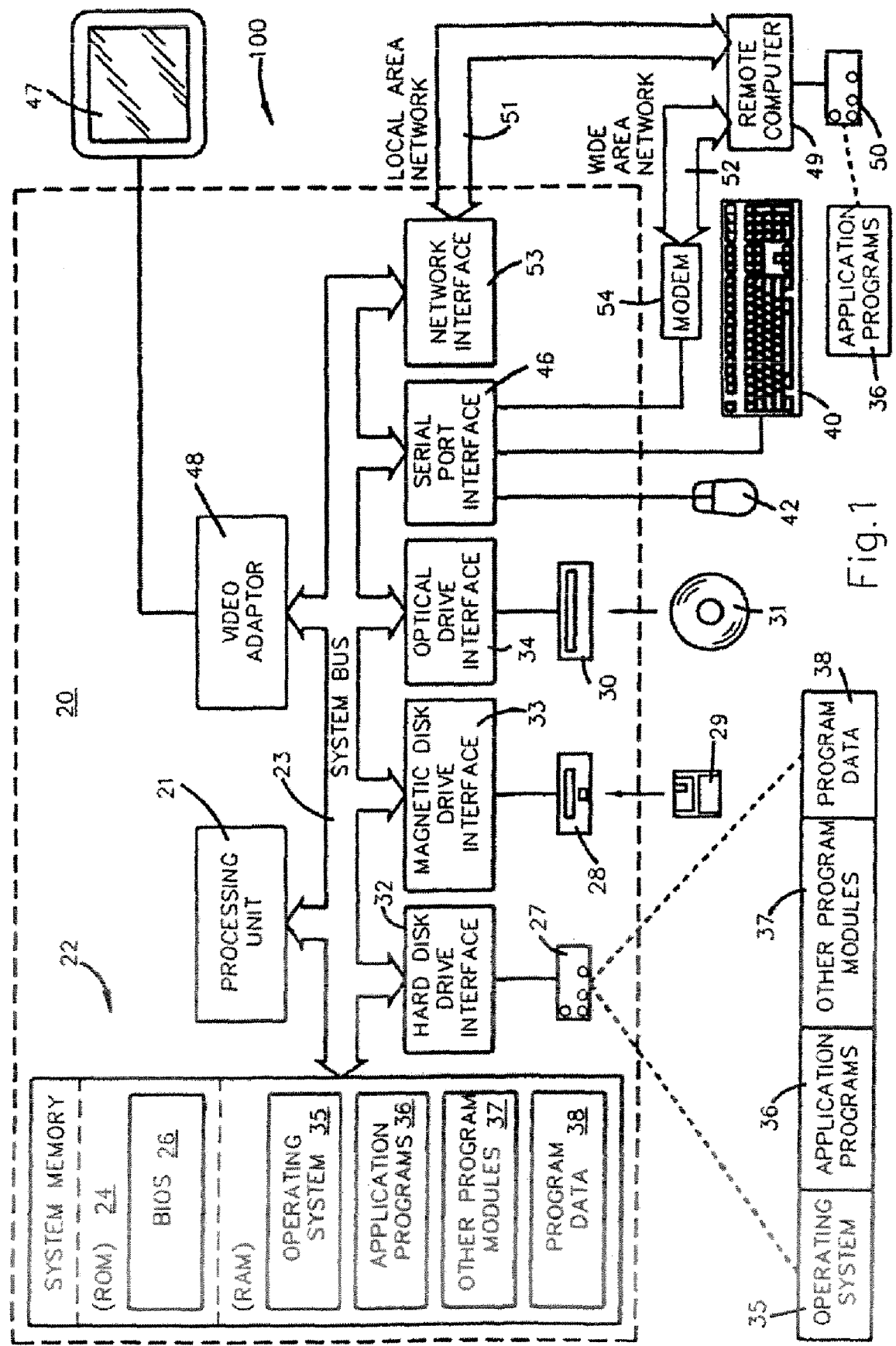
FIG. 1 is a exemplary data processing system for use in practicing the invention.

With reference to FIG. 1 an exemplary data processing system 100 for practicing the disclosed invention includes a general purpose computing device in the form of a computer system 20, including one or more processing units 21, a system memory 22, and a system bus 23 that couples various system components including the system memory to the processing unit or units 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that help to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35 wherein each of the multiple processors 21 of the computer system executes one or more program threads, one or more application programs 36, other program modules 37, and program data 38. A user may enter commands and information into the computer system 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49 that also includes a plurality of processors. The remote computer 49 may be another personal computer, a server, a router, a network PC, a peer device or other common network node, and typically includes many or all of the elements described above relative to the computer system 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device of the remote computer 49. It will be appreciated that the network connections shown are exemplary and other means of establishing a communications link between the computers may be used.

Figure 2:
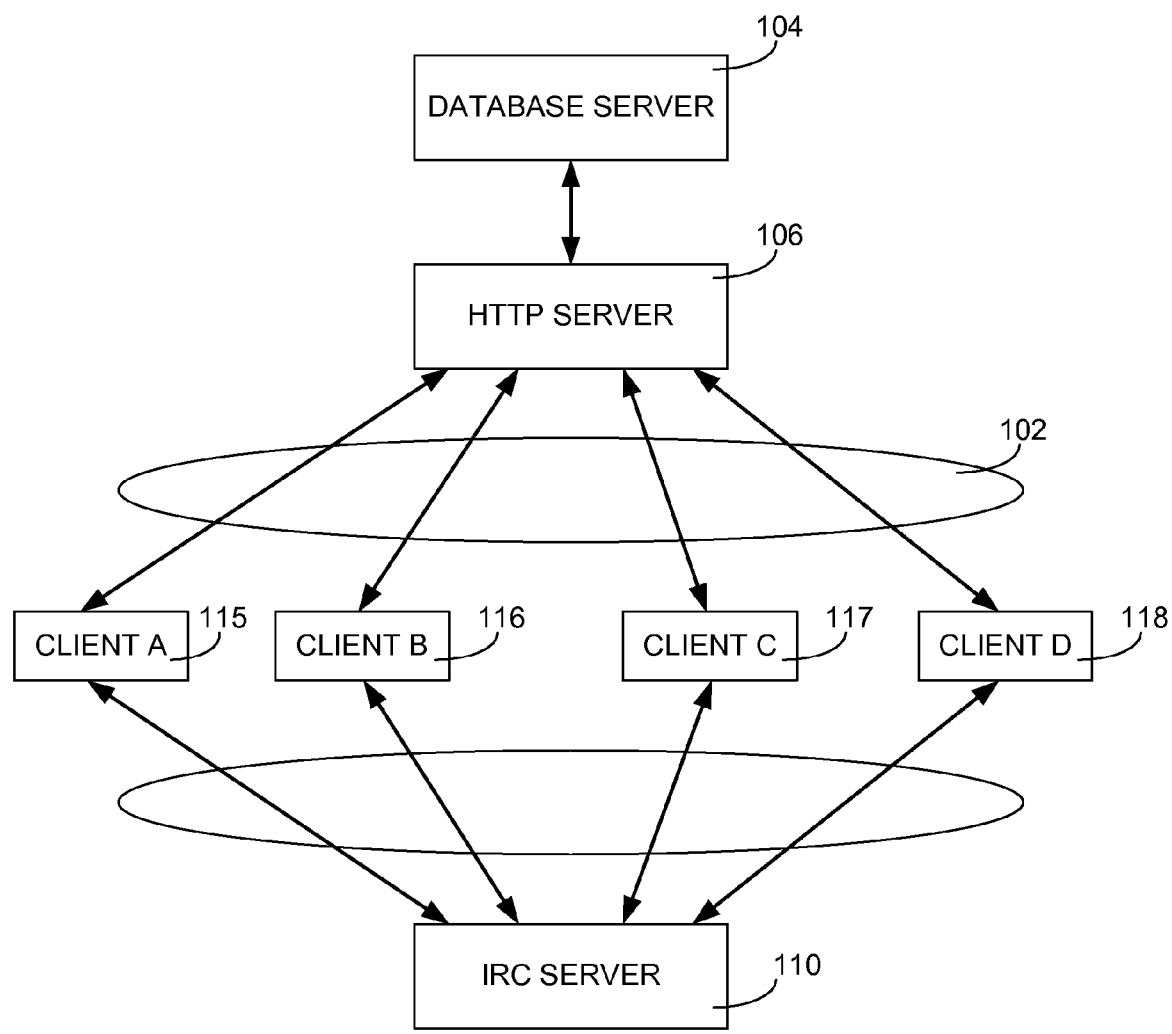
FIG. 2 is a schematic depiction showing a peer to peer real time update notification process.

FIG. 2 illustrates a representative computer configuration for communicating information between a plurality of client computers 115,116,117,118 coupled to a network 102 such as the local area network 51 or the wide area network 52 shown in FIG. 1. Data from a database server 104 is made available to the clients 115,116,117,118 by a server computer 106. This data is communicated from the server computer 106 to one or more of the client computers 115,116,117,118 in response to a request by a client computer 115,116,117,118 for the data. At periodic intervals the data on the database stored on the database server 104 is updated. After such an update of the data within the database, the server computer 106 presents updated information in response to a client request for data.

One means of updating the data within the database 104 is for one of the clients 115,116,117,118 to provide data to the server computer 106 which in turn makes that data part of the database by means of database management software executing on the database server 104. The client 115,116,117,118 that has updated the data in the database 104 communicates the fact that the data on the server has been updated to other clients 115,116,117,118. A client to client message from the client computer 115,116,117,118 that updated the data is sent to other client computers on the network 102. In response to receipt of such a client to client message the clients can then request the updated information from the server computer 106.

A typical application of the invention is a use wherein the database server 104 of FIG. 2 is one or more computers, the server 106 defines a node on the Internet, and the clients 115,116,117,118 are connected to the server 106 by means of the Internet. Such a system employs the HTTP protocol to implement client/server communications. This protocol, in combination with active server page scripts and ODBC technology provides widely distributed clients 115,116,117,118 access to a central scalable database of information. Without more, however, such a system does not provide change notification to the clients 115,116,117,118 concerning changes to the database and therefore prior art client polling of the server is required for the clients to have access to updated data.

Use of a separate, multi-client, real-time update protocol allows the clients 115,116,117,118 to notify the other clients when they make a change to the database stored on the database server 104. The IRC protocol (Internet Relay Chat) which was originally designed for text chat, is the preferred means of messaging the other clients 115,116,117,118. When a client makes a change to the database, the client first updates the database. Synchronization facilities in the database management software running on the database server 104 ensure orderly updating of the information in the database. The client then sends a change notification to a real-time channel that is implemented by means of an IRC server 110. All the other clients that are currently on-line monitor notices from the IRC server 110 and update their local information appropriately by making an update request from the HTTP server 106 for updated data from the database server 104.

In one embodiment, for increased efficiency, the database stored on the server 104 is divided into multiple distinct areas. For each area, there is a real-time channel defined. All clients who are interested in that area of the database open a connection to the real time IRC channel for that area. Thus, only those clients 115,116,117,118 who are active on-line and that have an interest in that database area are sent update notifications. The notification may optionally contain additional information detailing exactly what data was changed, so that clients interested in the area, but not in the particular data that was changed can ignore the notification and not seek an update from the server 106.

ALTERNATE EMBODIMENT OF THE EMBODIMENT

Figure 3:
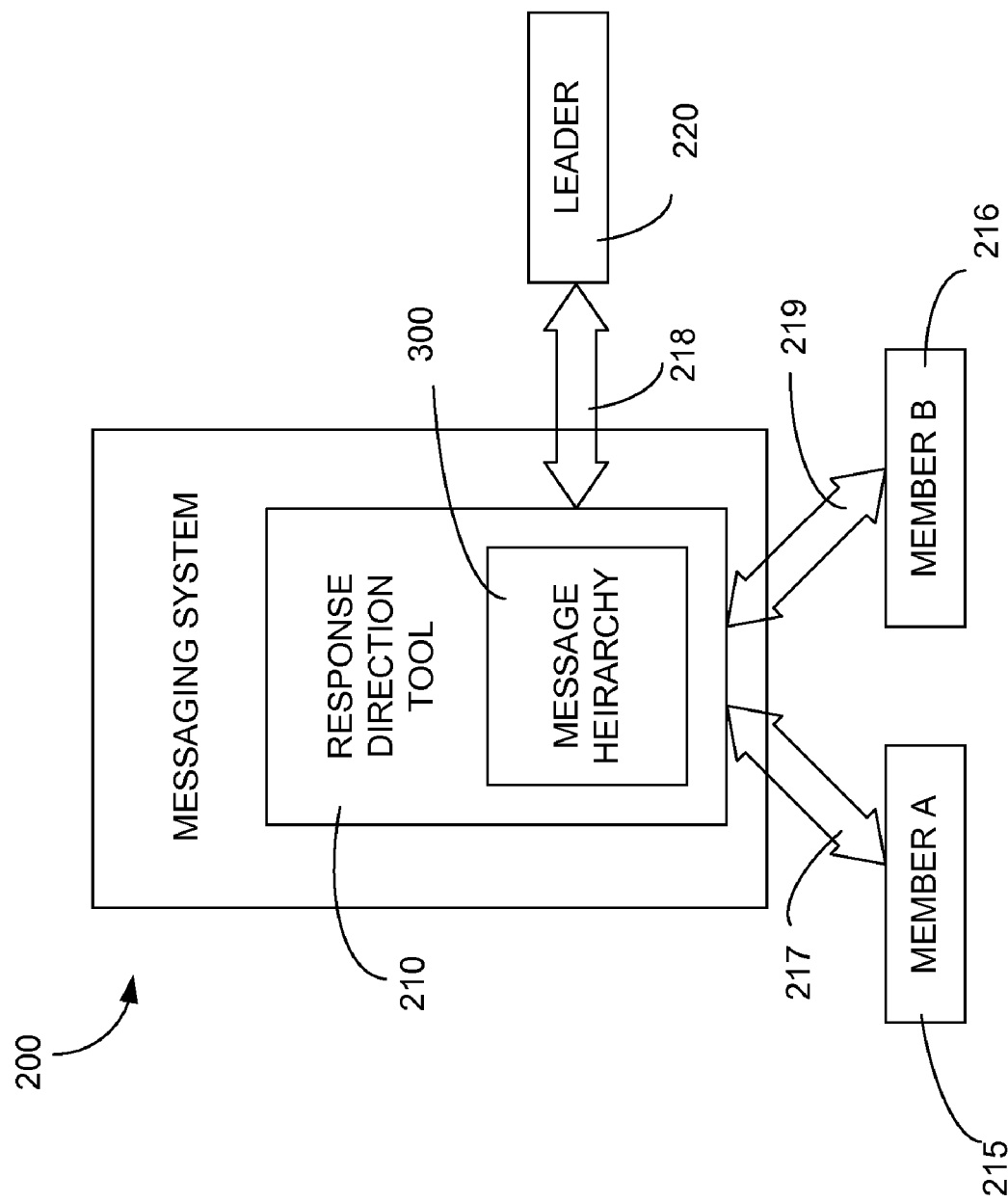
FIG. 3 is a depiction of a use of the invention with a goal-directed messaging system.

Referring now to FIG. 3, a collaborative messaging system 200 is depicted that features a response direction tool 210.

Project team members 215,216 send and receive electronic messages 217,219 via the messaging system 200. The messages relate to a given project that progresses along a time line to completion. A team leader 220 also sends and receives messages 218 via the messaging system. Messages 217,219, 218 are stored in a message hierarchy 300 within the messaging system. A response direction tool 210 accesses the message hierarchy 300 and interfaces with the members 215,216. The team leader 220 controls the response direction tool 210.

Figure 4:
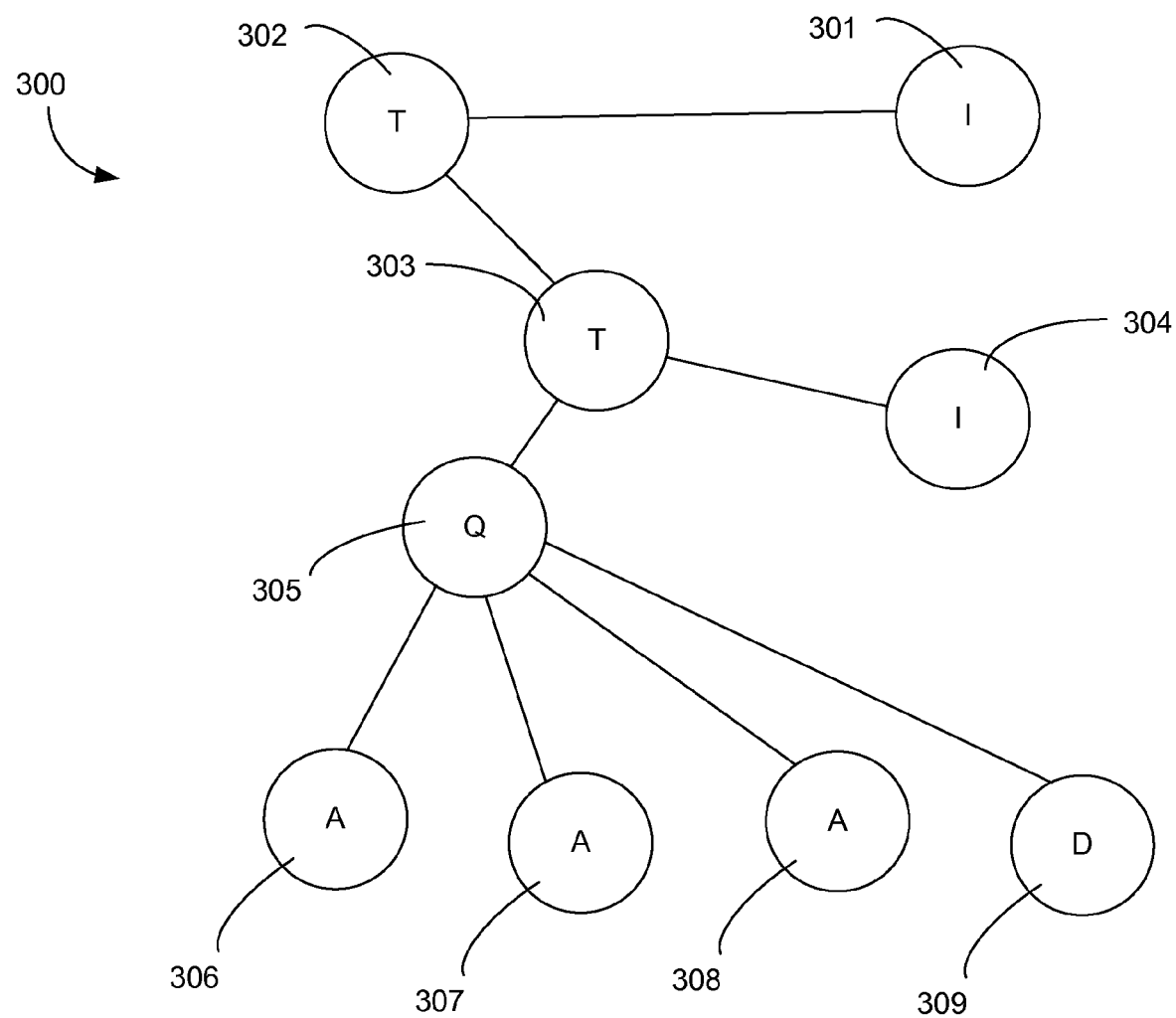
FIG. 4 is a message hierarchy of the FIG. 3 messaging system.

FIG. 4 depicts a representation of a message hierarchy 300. Messages that have been posted in the messaging system 200 are catalogued by the leader 220 into a message hierarchy tree structure 300 wherein messages are represented by nodes 301-309. Such a message hierarchy is stored for example on a server computer that is accessible from member computers by means of network communications. Related messages are represent by nodes that are connected such as node 305 and its sub-nodes 306-309. In general, nodes are added to the hierarchy at the edges or leaves. But is its also possible to insert a node between an existing node and that node's parent.

The nodes are assigned a type and a goal by the leader 220 by communicating with the response direction tool 210. The response direction tool accesses the hierarchy 300 to complete the assignment. The type and goal assigned to a node define the types of responses to the message represented by the node that will be deemed acceptable by the response direction tool 210. As a project progresses, the team leader changes the node goal to tailor the responses to ones that expedite completion of the project. Generally, the further a project moves toward completion, the more limited the desired responses from team members. By limiting the types of responses, the response direction tool 210 can prevent the introduction of new ideas and proliferation of discussion that may set a project back when a decision is necessary. The response direction tool 210 screens the members' messages 217,219 and limits them to those recommended by the node type and goal of the message at hand. In an exemplary embodiment, the response direction tool 210 displays a cautionary message when an inappropriate response is received from a member 215,216, but does not prevent the member from sending the message.

The goal directed messaging system of FIGS. 3 and 4 is implemented by means of network supported communications between the members 215,216 and the leader 220. The leader can communicate by means of a real time update message system that makes use of the IRC protocol described above. Additionally, each time a member 215,216 sends a message to the leader, the fact that an update has occurred can also be communicated to the other members that are participating in the collaborative effort. As in the previous example of the database (FIG. 2) the IRC channels could be used for different portions of the hierachical structure of FIG. 4. Each node could have its own channel or alternatively, different sections of the tree are assigned their own channel.

It is appreciated that although an exemplary embodiment of the invention has been described with a degree of particularity, it is the intent that the invention include modifications and alterations from the disclosed design falling within the spirit or scope of the appended claims.

What is claimed is:

1. A non-signal, computer-readable storage medium storing instructions which when executed by a processor, causes the processor to perform: providing new data to a database by one client computer of a plurality of client computers through an http server, the new data configured to be catalogued into a node of the database in a hierarchical structure that is accessible by the plurality of computers via a network, the node having a type, the new data having a type and comprising a message corresponding to a collaborative project among the plurality of client computers;

receiving a cautionary message if the new data is rejected by the database because the type of data does not match a type assigned to the node; and communicating by the one client computer of the plurality of client computers to at least one of the remaining client computers by an Internet Relay Chat (IRC) message that new data to the database has been provided through the http server, wherein the IRC message is transmitted through a first IRC channel to a first set of the plurality of client computers if the new data is stored in a first location of the database and is transmitted through a second IRC channel to a second set of the plurality of client computers if the new data is stored in a second location of the database, the first set different than the second set, the first location different than the second location, and the first channel different than the second channel.

2. A non-signal, computer-readable storage medium of claim 1 wherein the node is assigned a goal for defining a type of data configured to be received at the node.

3. A non-signal, computer-readable storage medium of claim 2 comprising receiving a second cautionary message from the database when a type of the message does not match the goal of the node.

4. A non-signal, computer-readable storage medium of claim 3 wherein the one client computer is configured to selectively communicate the IRC message to one or more of the remaining plurality of client computers based upon a location in the database wherein the new data is stored.

5. A non-signal, computer-readable storage medium of claim 1 wherein the one client computer is configured to selectively communicate the IRC message to one or more of the remaining plurality of client computers based upon a location in the database wherein the new data is stored.

6. A non-signal, computer-readable storage medium of claim 1 comprising, before communicating the IRC message, creating the IRC message, the IRC message configured to prompt one or more of the remaining plurality of client computers to which the IRC message is communicated to automatically access the new data in the database.

7. A non-signal, computer-readable storage medium of claim 1 comprising, before communicating the IRC message, creating the IRC message, the IRC message comprising information about the new data and an acceptance mechanism, the acceptance mechanism configured to allow a client of one or more of the remaining plurality of client computers to which the IRC message is communicated to accept or decline the IRC message, wherein, if accepted, the IRC message is configured to cause the client computer to assess the new data in the database.

8. A system for updating data in a hierarchical database comprising:

one client computer of a plurality of client computers, the one client computer configured to:

provide new data to the database through an http server, the new data configured to be catalogued into a node of the database in a hierarchical structure that is accessible by the plurality of computers via a network, the node having a type, the new data having a type and comprising a message corresponding to a collaborative project among the plurality of client computers;

communicate to at least one of the remaining client computers of the plurality of client computers by an Internet Relay Chat (IRC) message that new data to the database has been provided through the http server, wherein the IRC message is transmitted through a first IRC channel to a first set of the plurality of client computers if the new data is stored in a first location of the database and is transmitted through a second IRC channel to a second set of the plurality of client computers if the new data is stored in a second location of the database, the first set different than the second set, the first location different than the second location, and the first channel different than the second channel; and a messaging system configured to receive a cautionary message if the new data is relected by the database because the type of data does not match a type assigned to the node.

9. The system of claim 8 wherein a response direction tool determines that the type of the message received from the one client computer matches the type of node and wherein a message hierarchy updates the message at the node based on the determination of the response direction tool.

10. The system of claim 8 wherein a message hierarchy receives an update signal for updating the type of the node and wherein the type of the message received from the one client computer is compared to the updated type of the node.

11. The system of claim 10 wherein the message hierarchy updates the message at the node if the type of the message received from the one client computer matches the updated type of the node.

12. The system of claim 8 wherein a response direction tool is configured to determine that the message is undesirable when the type of the message received from the one client computer does not match the type of the node.

13. The system of claim 12 wherein a message hierarchy updates the message at the node with both the undesirable message and the cautionary message when the response direction tool determines that the message received from the one client computer is undesirable.

14. A method of updating data within a database comprising:

providing new data to the database by one client computer of a plurality of client computers through an http server, the new data configured to be catalogued into a node of the database in a hierarchical structure that is accessible by the plurality of computers via a network, the node having a type, the new data having a type and comprising a message corresponding to a collaborative project among the plurality of client computers;

receiving a cautionary message if the new data is rejected by the database because the type of data does not match a type assigned to the node; and communicating by the one client computer of the plurality of client computers to at least one of the remaining client computers by an Internet Relay Chat (IRC) message that new data to the database has been provided through the http server, wherein the IRC message is transmitted through a first IRC channel to a first set of the plurality of client computers if the new data is stored in a first location of the database and is transmitted through a second IRC channel to a second set of the plurality of client computers if the new data is stored in a second location of the database, the first set different than the second set, the first location different than the second location, and the first channel different than the second channel.

15. The method of claim 14 comprising, before communicating the IRC message, creating the IRC message, the IRC message configured to prompt one or more of the remaining plurality of client computers to which the IRC message is communicated to automatically access the new data in the database.

* * * * *